United States Patent [19]

Juvinall

[11] 4,175,236
[45] Nov. 20, 1979

[54] METHOD AND APPARATUS OF CAVITY IDENTIFICATION OF MOLD OF ORIGIN

[75] Inventor: Jonn W. Juvinall, Ottawa Lake, Mich.

[73] Assignee: Owens-Illinois, Inc., Toledo, Ohio

[21] Appl. No.: 864,080

[22] Filed: Dec. 23, 1977

[51] Int. Cl.² .............................................. G06K 7/10
[52] U.S. Cl. .................................. 250/566; 250/223 B
[58] Field of Search ........................... 250/223 B, 566; 235/464; 356/240

[56] References Cited

U.S. PATENT DOCUMENTS

| | | | |
|---|---|---|---|
| 3,513,320 | 5/1970 | Weldon | 250/566 |
| 3,745,314 | 7/1973 | Mathias | 250/223 B |

Primary Examiner—M. Tokar
Attorney, Agent, or Firm—D. T. Innis; Myron E. Click; David H. Wilson

[57] ABSTRACT

This invention relates to a system of determining which of a plurality of molds produced a particular container. A concentric ring code is molded into the bottom of each container as it is produced. The containers are then passed by a reading station, where light whose intensity is proportional to the angle of incidence is projected onto the bottom of the container. Readings are taken of the variation of intensity of light reflected to a particular point in order to determine the position of rings on the container. Suitable electronics then decode the ring position to determine the container code, thus allowing identification of the mold which produced each container.

20 Claims, 19 Drawing Figures

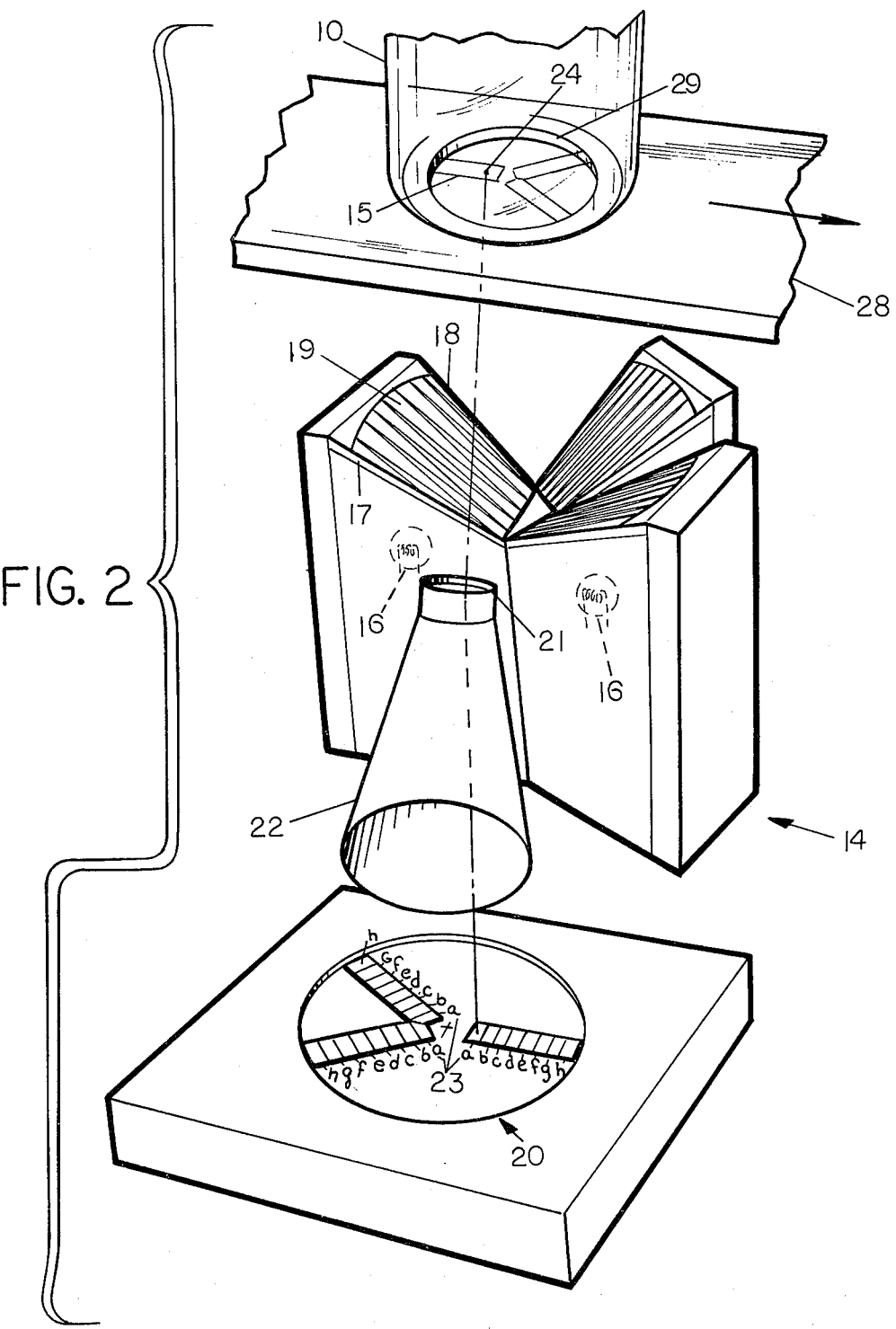

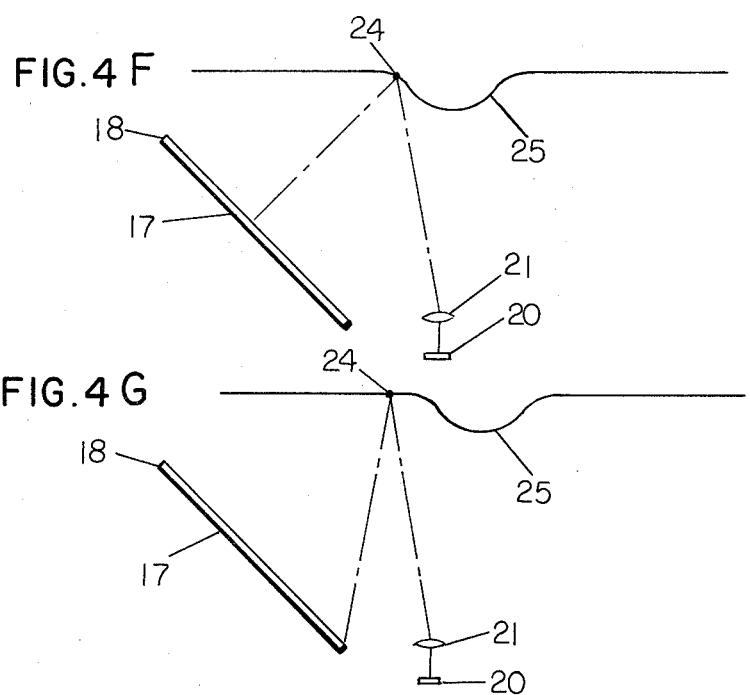
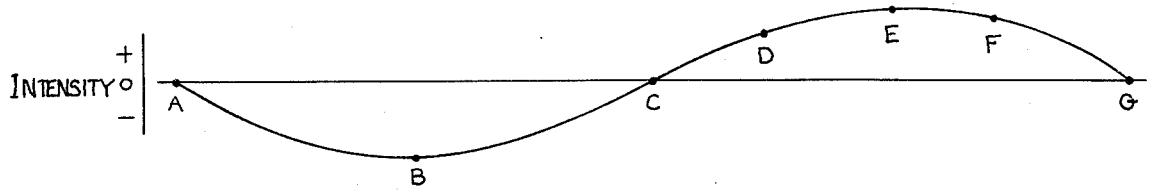
FIG. 5

METHOD AND APPARATUS OF CAVITY IDENTIFICATION OF MOLD OF ORIGIN

BACKGROUND OF THE INVENTION

Defects in glass bottles are often mold related. For this reason, it is useful to have a system which can identify which of a plurality of molds produced a particular bottle. The defective mold may then be shut down while the remaining molds continue to operate. Alternatively, the defective bottles may be automatically rejected as they proceed down the production line.

Mold identification is generally accomplished by molding a particular code into each bottle during the forming process. The code is later read by a scanner, which identifies the defective mold. Another method is to mark bottles produced by a particular mold, which allows for later identification and separation, as shown in U.S. Pat. No. 4,004,904. This system has the disadvantage of requiring that the bottles be in a particular sequence in order to allow proper marking of mold origin.

Several techniques have been developed for encoding a bottle and for reading the code. In U.S. Pat. No. 3,745,314, a bottle is held stationary while an image of a code molded into the bottom of a bottle is rotated past a reading station. The major disadvantage of this design is that the bottle must be at a standstill while the code reading is taking place, thus slowing down the production line process. In U.S. Pat. No. 3,963,918, a bottle with a circular code is brought to a standstill, and the code is read either by rotating the bottle or the reading receiver. This has the similar disadvantage of having to stop the bottle. U.S. Pat. No. 3,991,883 does not require bringing the bottle to a standstill, but still requires relative rotation between the bottle and the light source which is utilized to project the coded information onto the reading apparatus. A further disadvantage of all of the above-named inventions is that they employ a circular code, whose validity may be checked only by making successive readings of the code.

A principal advantage of the present invention is that no relative rotation between the bottle and the reading device or light source is required, thus simplifying operation.

Another advantage of the present invention is that readings may be taken simultaneously in several areas of the bottle in order to check the validity of the code reading, thus increasing the accuracy of mold identification.

SUMMARY OF THE INVENTION

This invention relates to a method and apparatus for automatically identifying which of a plurality of molds produced a particular object. More particularly, this invention relates to the identification of the mold of origin of glass bottles. In the preferred embodiment, a series of concentric rings is molded into the bottom of each bottle during production. The location of these rings on bottles produced by a particular mold differs from the location of rings on bottles produced by every other mold, thus providing a code to distinguish mold origin of particular bottles.

After production, the bottles are passed above a reading station where the coded series of rings is read. This is accomplished by focusing a light source through a lens towards the bottom of the bottle. The light passes through a filter which causes the intensity of the light to vary linearly with its angle of incidence upon the bottom of the bottle. The light is reflected from the bottle through a second lens and directed to a photocell light sensor, whose output is proportional to the intensity of light received. As the bottle is moved past the scanning station, the angle of incidence, and thus the intensity, of light reflected off of the bottle and through the lens will vary depending upon whether the reflection is from the relatively flat bottom surface of the bottle or a leading or falling edge of a ring.

If reflection from the flat surface is taken as a reference level, it will be shown that the intensity of the light will either rise above or fall below the reference level, depending upon the direction of travel of the bottle, when the leading edge of a ring is encountered. The intensity will then quickly fall below (or rise above) the reference level when the falling edge is encountered, and returned to the reference level as the ring is passed. By detecting the rate of change of intensity between leading and falling edges of the rings on a bottle, accurate detection of ring placement is accomplished in spite of defects in the bottom of the bottle such as faint rings or near zero push-ups (bulges in the center of the bottoms of bottles). The position of rings defines a code which is then electronically decoded so as to identify the mold of origin of each container.

BRIEF DESCRIPTION OF THE DRAWINGS

In the drawings:

FIG. 2 shows a view of a code reading device with a glass container passing above it;

FIG. 5 is a graph of the intensity of light received by the photocell detector as the glass container moves past the code reading device;

DETAILED DESCRIPTION OF THE DRAWINGS

Figure 1:
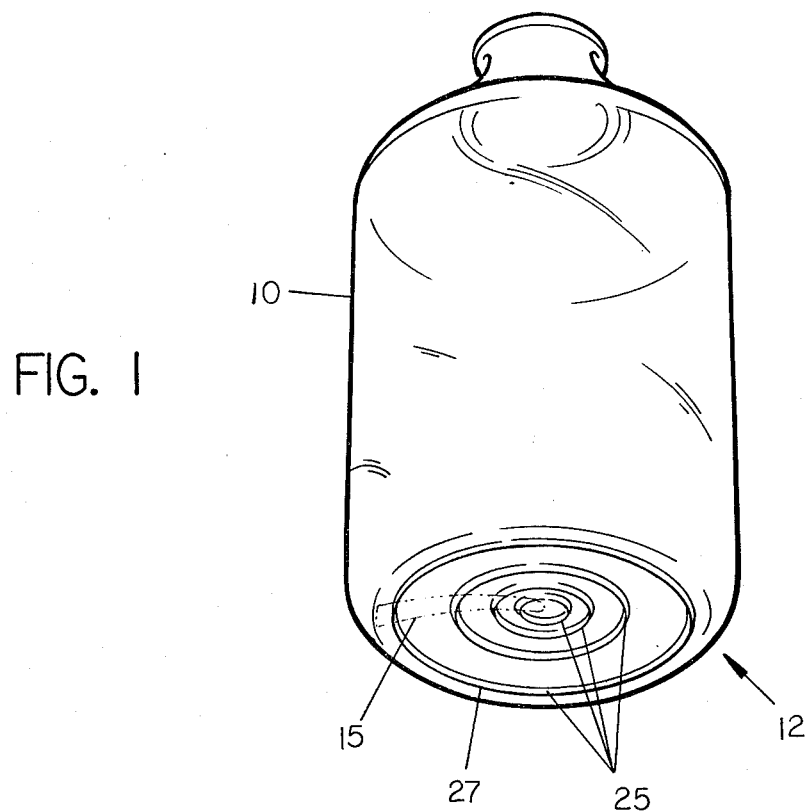
FIG. 1 shows a glass container with an integrally molded concentric ring code.

Referring to FIG. 1, a molded container 10, which in the preferred embodiment is a glass bottle, includes an integrally molded concentric ring code 12, having a plurality of rings 25, including an outside start ring 27, which are defined by projections which are generally rounded. As shown in FIG. 2, the container 10 is supported above a reading station 14 and moved relative to it by a transport apparatus 28, which includes an opening 29 to allow readings to be taken from the bottom of a container 10. As the container 10 is moved past the reading station 14, light reflected from the start ring 27, included in the ring code 12, initiates the code reading process. The function of the start ring 27 will be explained when the decoding process is discussed. Light from a light source 16, which in the preferred embodiment is incandescent, passes through a lens 17, a gradient filter 18, and is projected onto the bottom of the container 10. The lens 17 focuses light from the light source 16 through the filter 18 and onto an area 15 across a radius of the bottom of container 10. The gradient filter 18, which is generally rectangular in shape, is constructed such that its transparency is gradually reduced along the length of its traversing axis. In the present embodiment, this is accomplished with a series of narrowing slits 19, but other methods could also be employed. The slits 19 are sized as shown in FIG. 2, so that light emanating from the filter 18 is attenuated linearly along its traverse axis. The filter 18 is positioned such that the intensity of light striking any particular point in area 15 on the bottom of the container 10 is a function of the angle of incidence. Because of the tapered slits 19 that form the filter 18, as shown in FIG. 2, the light passing out of the filter 18 will be of greater intensity at the left or upper end of the filter than the right or lower end of the filter. Thus light that originates at the upper end of the filter is reflected from the container onto the detector 20 will be of greater intensity than light that passes through the lower end and is reflected from the bottom of the container. The intensity of the light striking the bottom of the container will be a function of the angle of incidence relative to the plane of the container bottom because of the filter. A lens 21, supported by a housing 22, focuses light reflected from the bottom of container 10 onto a photocell detector means 20, whose output is proportional to the intensity of light received. The photocell means 20 receives reflections from a location on the container 10 corresponding to particular fixed reference point 24 on a plane generally defined by the bottom of the container 10. In the preferred embodiment of the invention, a plurality of photocell detectors 23 *a–h* comprise the photocell detector means 20, with each detector 23 *a–h* having a corresponding reference point from which it receives reflections. As can be seen when viewing FIG. 2, the entire image of the bottle bottom illumination will be projected onto the pickup 20. Obviously the reflected light will be that which is the result of specular reflection from the container bottom. For the purposes of clarity, the operation of only one of the photocell detectors 23 *a–h* is discussed here. As the container 10 passes the reference point 24, light received by the photocell detector 23-*a* will vary in intensity depending upon the angle of incidence of light emanating from the filter 18 since this is the light that is reflected from the container onto the detector. The origin and therefore the intensity of the light that is reflected from a ring 25 will depend upon whether the light passes from the upper or lower end of the filter 18 as viewed in FIG. 4. Since the angle of incidence varies when a ring 25 is encountered, the intensity of light striking the photocell detector 23-*a* will likewise vary whenever a ring 25 passes the reference point 24. The output of the photocell detector 23-*a* is thus a function of the placement of rings 25 on the bottom of container 10.

To allow the validity of a particular reading of the ring code 12 to be checked, three separate reflective readings are taken from the bottom of the container 10, and later compared by the use of majority logic, to be discussed in conjunction with FIG. 11. In the preferred embodiment of the invention, three light sources 16, three lenses 17, three filters 18 and three groups of photocell detectors 23 *a–h* are positioned to take reflective readings from three distinct radial areas 15 across the ring code 12.

Figure 3:
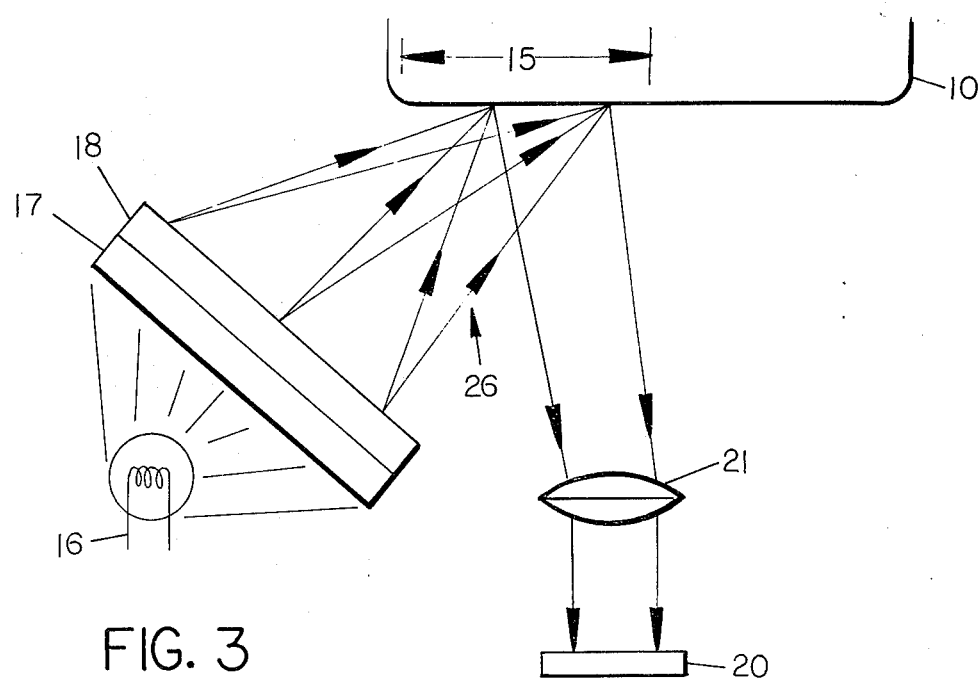
FIG. 3 shows paths of light travel from a light source to the bottom of a glass container.

Referring now to FIG. 3, the light path from the filter 18 to the radial area 15 on container 10 is shown. Light rays 26 demonstrate that at any point along the radial area 15, light is received from all points along the length of the filter 18. The origin of light which is reflected to the photocell detector means 20 from any point will depend upon the angle of incidence on the bottom of the container 10.

Figure 4:
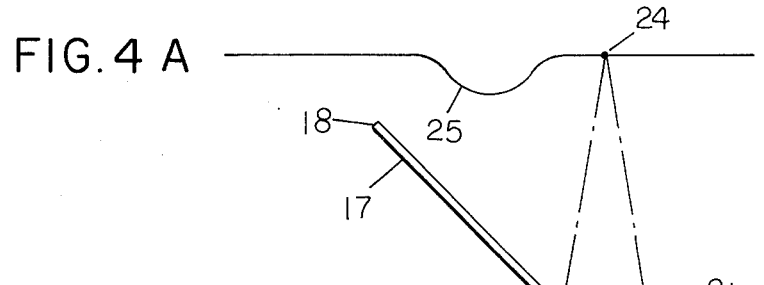
FIGS. 4 A-G shows the path of light reflected to a photocell detector as the glass container moves past the code reading device.
Figure 4:
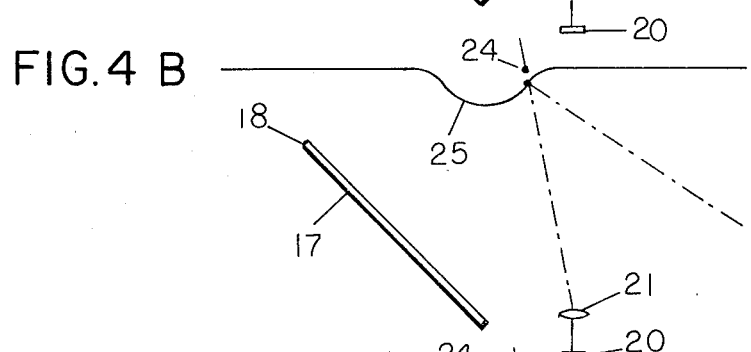
Figure 4:
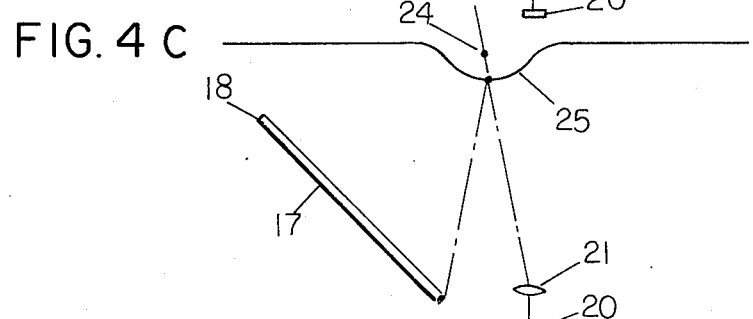
Figure 4:
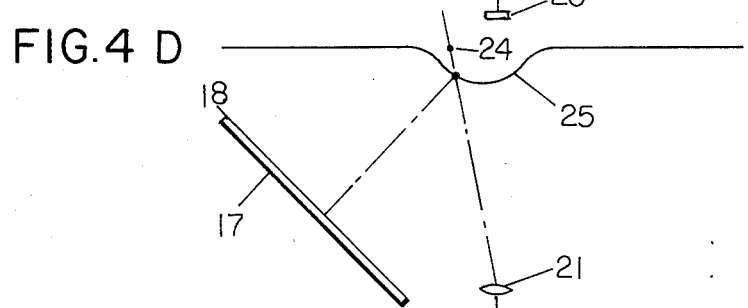
Figure 4:
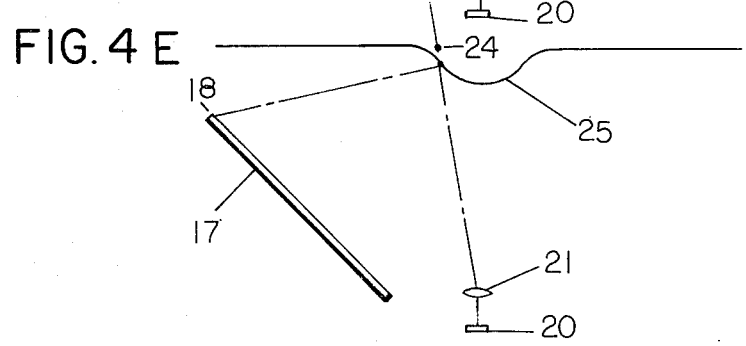

Referring to FIGS. 4 A–G and 5, the change in intensity of light reflected to the photocell detector 23-*a* from the reference point 24 as the container 10 moves past the reading station 14, is shown. In FIG. 4A, a flat portion of the bottom of the container 10 is in a position corresponding to the reference point 24 (i.e. no ring). Light reflected from this point is seen to have originated from a relatively dim portion of the filter 18. The intensity of light reflected from this point is taken as a reference or zero level. As the container moves past the reference point 24, a ring 25 is encountered. As the reference point 24 is passed by the leading edge of the ring 25, no light is reflected to the lens 21. The only light reflected to the lens 21 at this point would be ambient light, as shown in FIG. 4B. When the reference point 24 corresponds to the top of the ring 25 (FIG. 4C), the angle of reflection is the same as that from the flat area where no ring is present. When the falling edge of the ring 25 moves past the reference point 24, however, light is progressively reflected from brighter portions of the filter 18, as shown in FIGS. 4D and 4E. The reflective angle, and thus the intensity of light, then gradually decreases (FIG. 4F) until the reference point 24 again corresponds to a portion of the container 10 where no ring 25 is present (FIG. 4G). A graph of the intensity of light reflected as the container 10 moves past the reading station is shown in FIG. 5, with points A–G corresponding to the position of the container in FIGS. 4 A–G, respectively.

Figure 6A:
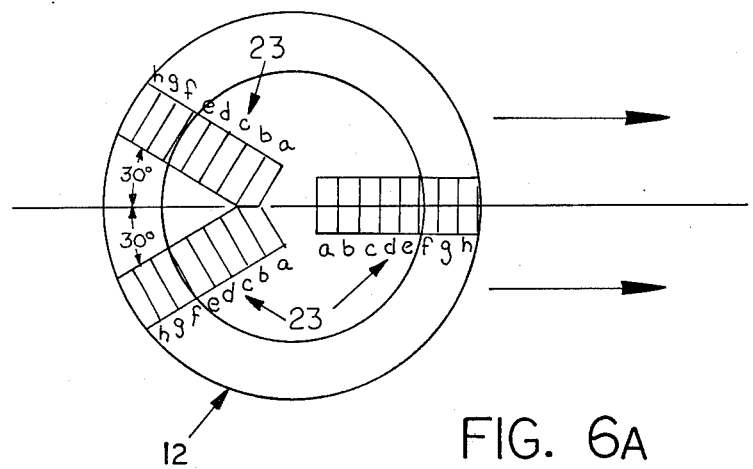
FIGS. 6 A-C shows different possible locations of photocell detectors in relation to the molded concentric ring code.
Figure 6C:
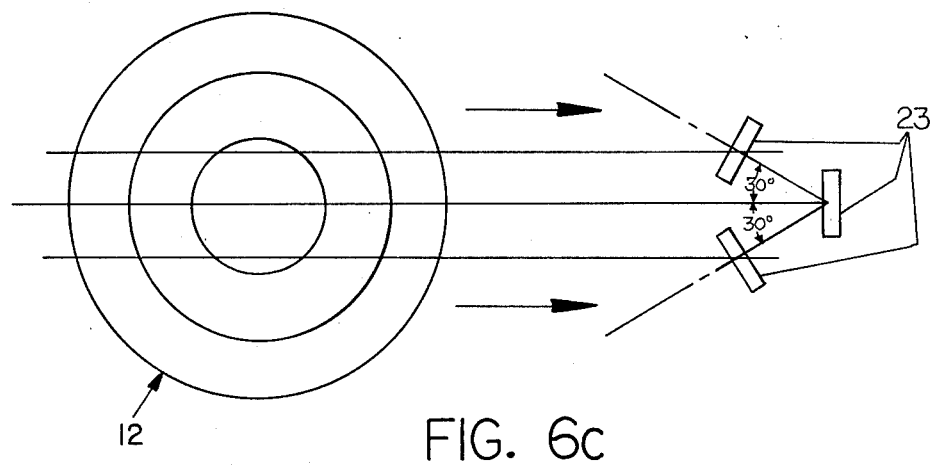
Figure 6B:
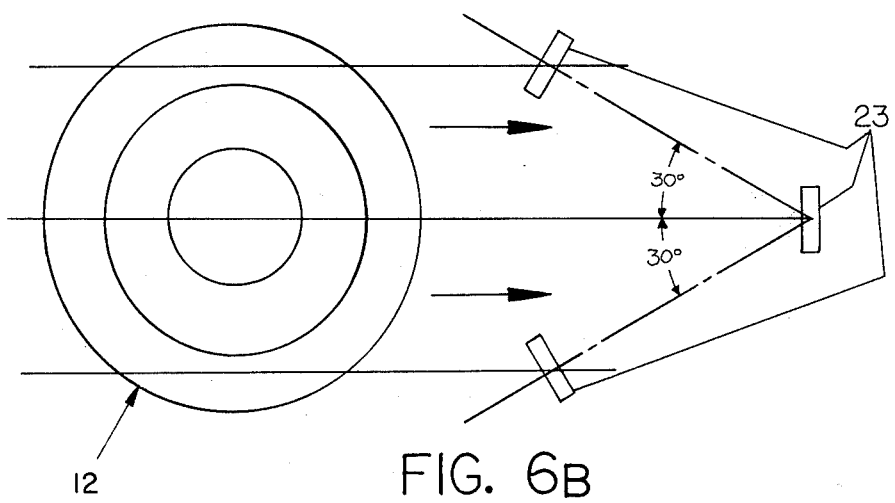

Referring now to FIGS. 6 A–C, the photocell means 23 used for readings in each of the three radial areas 15 includes eight photocell detectors 23 *a–h* arranged along a line corresponding to a radius of the ring code 12 when it is centered over the reading station 14. In the preferred embodiment of the invention, one group of photocell detectors 23 *a–h* is positioned corresponding to the line of motion of the center of the ring code 12, while the other two groups of photocell detectors 23 *a–h* are positioned at 30° angles with respect to the line of motion of the center of the ring code 12. The size of this angle is not critical but should be large enough to take readings in relatively distinct areas of the ring code 12. A plurality of photocell detectors 23 are employed, each one responding to reflections from only a small portion of a radius of the ring code 12 (i.e. each has its own reference point 24) on the bottom of the container 10, to allow readings to be taken from radii off of the line of travel of the center of the ring code 12. Use of only one detector would require placement relatively close to the line of travel of the center of the ring code 12, as placement well off of the line would result in the inability to read the inner rings of the code 12 as the container 10 passed by the reading station 14, as shown by FIG. 6B. Close placement, however, would result in readings being taken in areas of the ring code 12 which are relatively close to one another, as shown by FIG. 6C. By utilizing a plurality of photocell detectors 23, every ring 25 may be read while allowing relatively distinct areas of the ring code 12 to be read. Each photocell 23 a–h responds to reflections over a small portion of the radius of ring code 12. These readings are later combined to obtain a reading of the entire ring code 12, as will be discussed in connection with FIG. 10.

Figure 7:
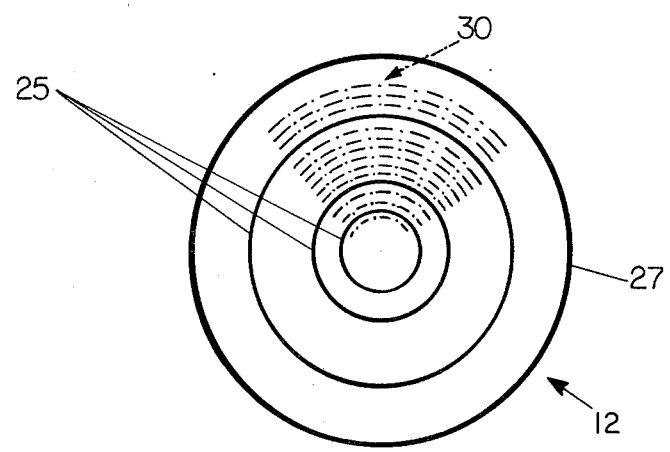
FIG. 7 shows a plan view of a concentric ring code.

Referring to FIG. 7, the start ring 27 is the outermost ring of the ring code 12, and is molded at the same position in the bottom of every container 10. The ring code 12 is defined by the presence or absence of a ring 25 within each of a particular number of possible ring positions generally designated 30. The presence of a ring 25 in a possible position 30 defines the binary bit 1, while the absence of a ring 25 in a possible position 30 defines the binary bit 0. Various combinations of rings 25 thus define different binary code numbers, which may be used to identify the mold of origin of any container 10. It should be appreciated that it is not necessary that a binary code be utilized and that many different code configurations (e.g. octal) could be employed.

Figure 8:
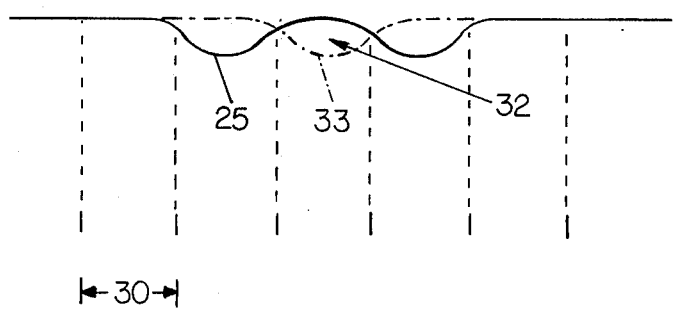
FIG. 8 shows a side view of rings which are molded into particular positions in a glass container.

The number of rings 26 which may be molded into a container is relatively low, which correspondingly limits the number of possible coded ring combinations. In order to maximize the number of combinations, the number of possible ring positions 30 is increased, but the code is defined such that there will never be rings 25 in two adjacent possible positions 30. Referring to FIG. 8, a valley 32 between rings 25 in alternate possible ring positions 30 would encompass enough of a relatively flat area to define a binary zero corresponding to the absence of a ring 25 in that particular possible ring position 30. The physical limitation that no rings 25 can occupy two adjacent possible ring positions 30 is illustrated by dotted line 33, which represents the position a ring 25 would occupy in an adjacent possible ring position 30. In such a case, the rings 25 would not be able to be fully formed, and it would not be possible to obtain a valid code reading.

To illustrate the use of the code just described, a container 10 large enough to allow six rings 25 to be molded into it would have $2^6$ or sixty-four possible combinations, if six possible ring positions 30 are used. By utilizing eleven possible ring positions 30 with no two rings 25 in adjacent possible positions 30, however, the number of combinations increases to two-hundred-thirty-two. As this many combinations is generally not needed, the code which is molded into a container 10 may be restricted to particular combinations of rings 25 and each reading checked against this restriction in order to increase the accuracy of the code readings. In the preferred embodiment of the invention, utilizing a container 10 with eleven possible ring positions 30, a dual restriction is employed. The first of these is that there will always be exactly three rings 25 present in the code in addition to the start ring 27. Secondly, either one or two of these rings 25 will be located within the three innermost possible ring positions 30, with the prohibition against rings 25 in adjacent possible ring positions 30 still applying. The number of possible combinations with these limitations is reduced to sixty-four, which is generally as many as would be needed. The restrictions serve to prevent the registering of incorrect readings of a code caused, for example, by molding defects or variations from flatness in the bottom of the container 10. As an example, a molding defect might be read as an additional ring 25, but the reading would be rejected as invalid since four rings 25 would now be read instead of three.

Figure 9:
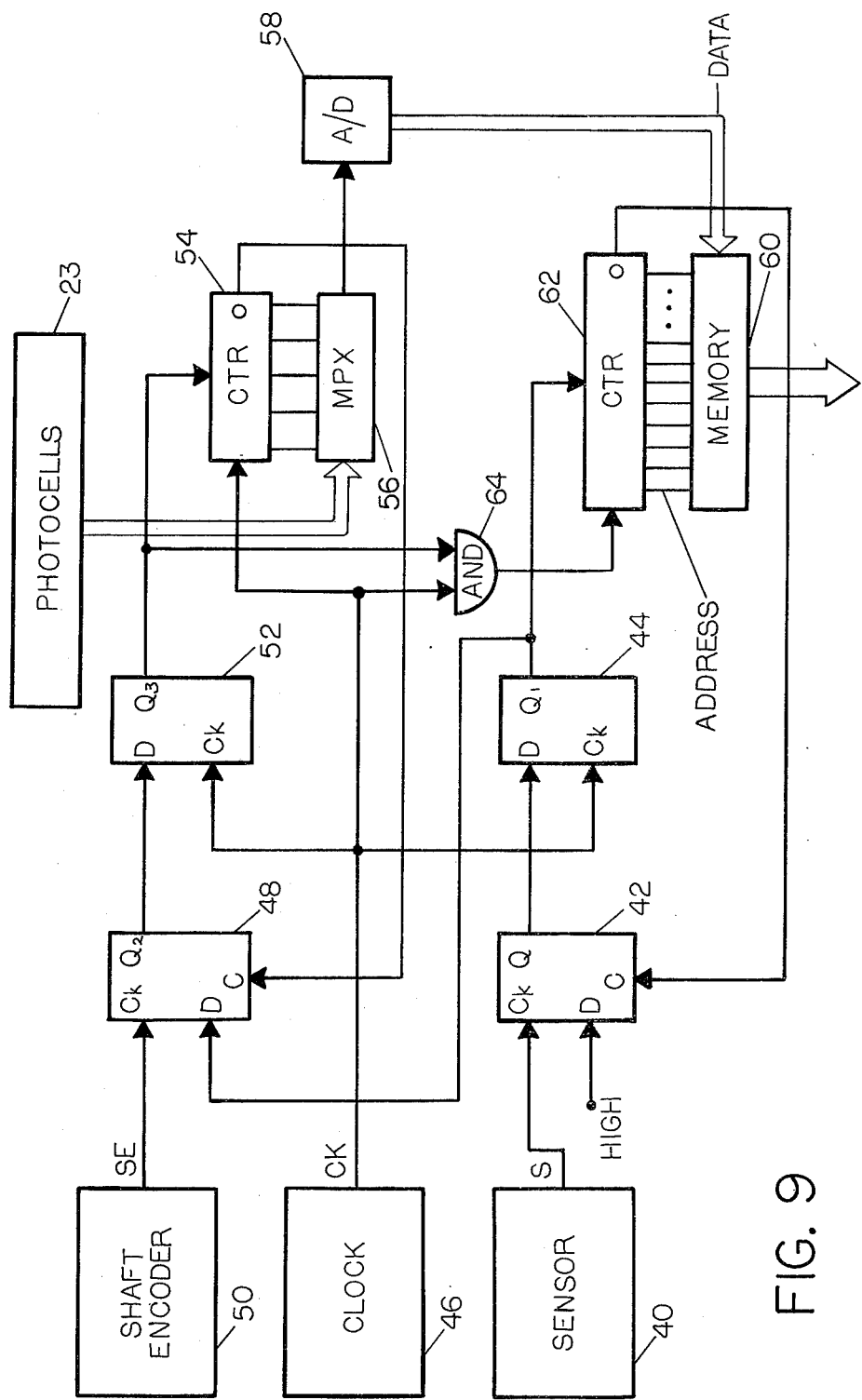
FIG. 9 shows a schematic diagram of an electronic circuit used for storing code readings in a memory.
Figure 10:
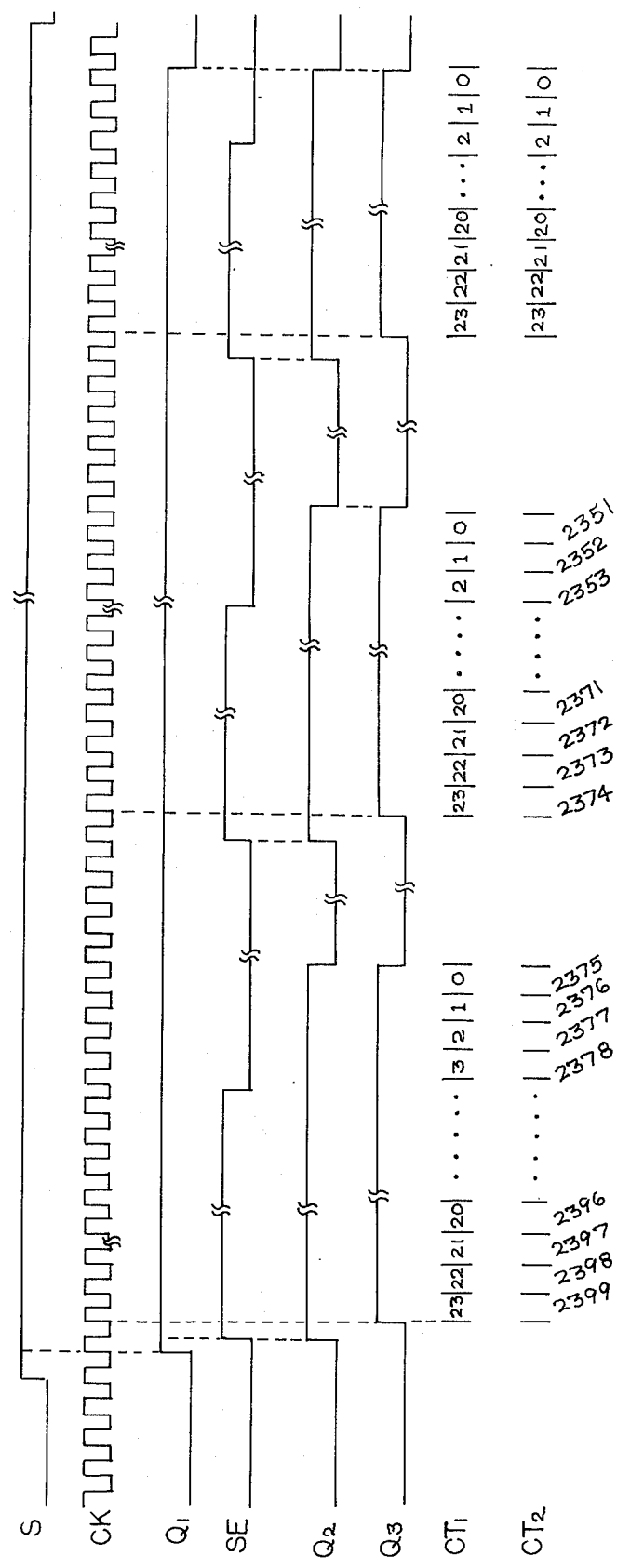
FIG. 10 is a drawing of the waveforms of signals appearing at various points in the circuit of FIG. 9.

Referring to FIGS. 9 and 10, the codes reading process of the invention will be described. All flip-flops described are D type, whose output goes to zero when a clear signal is received, and passes the signal at the data input to the output when the edge of a clock signal appears. Initially, as a container 10 comes near the reading station 14, a sensor 40 detects the presence of the container 10 and generates a signal S which is fed into the clock input of flip-flop 42. The high signal which is at the data input is then passed to the output of flip-flop 42 and fed into the data input of flip-flop 44. The output $Q_1$ of flip-flop 44 goes high when the edge of clock signal CK as shown in FIG. 10 from signal generator 46 is received at the clock input. This output is sent to the data input of flip-flop 48. The output $Q_2$ (shown in FIG. 10) of flip-flop 48 goes high when a signal from a shaft encoder 50, which emits pulses SE (also shown in FIG. 10) corresponding to container motion of a predetermined amount, is received at its clock input. In the present embodiment of the invention, the shaft encoder pulse SE corresponds to 0.004 inches of container 10 movement. The output $Q_2$ of flip-flop 48 is then fed to the data input of flip-flop 52, which causes the output $Q_3$ to go high when the edge of a clock pulse CK appears at the clock input of flip-flop 52. The high $Q_3$ signal causes a counter 54 to switch from the load state, where it had been previously loaded to reflect a number equal to the number of cells to be read, to the count state. The rate of the counter 54, which counts from the preloaded number down to zero, is controlled by the clock pulse CK. Counter 54 is used as a cell address to pass the signals from the twenty-four photocells through a multiplexer 56. In the preferred embodiment, the counter 54 makes twenty-four counts within the time of each shaft encoder pulse, which enables one reading from each of the photocell detectors 23 to pass through the multiplexer 56, as shown in diagram $CT_1$ of FIG. 10. The output of the multiplexer 56 is fed to an analog to digital converter 58, which converts the amplitude of a signal into an eight bit binary number, which allows an amplitude range of zero to two-hundred-fifty-five to be represented. The output of the converter 58 is then fed into a memory 60. Thus, for each count of the counter 54, an eight bit binary number representing the amplitude of one of the twenty-four photocell detectors 23 is placed into the memory 60. When the count in the counter 54 reaches zero, a signal is sent to clear flip-flop 48. Since $Q_2$ will then switch to a low output, $Q_3$ will likewise switch, thus putting the counter 54 into the load mode. The sequence will begin again when the next pulse from the shaft encoder 50 is received. Thus, with each shaft encoder 50 pulse, an eight bit amplitude reading from each of the twenty-four photocells 23 is stored in the memory 60.

The output of flip-flop 44 is also used to control counter 62, which counts the total number of readings to be taken from a container 10. To illustrate, if it is desired that readings be taken for a period corresponding to four-tenths of an inch of container 10 movement, one-hundred readings will be taken by each of the twenty-four photocells 23, since a reading is taken for every four thousandths of an inch of container 10 motion. The counter 62 thus needs to make two-thousand-four-hundred total counts to cover all of the readings taken by each of the twenty-four photocells 23. When the signal at $Q_1$ switches from low to high, signifying container 10 presence, the counter 62, which was preloaded to a number equal to the number of counts to be made, will switch to the count mode from the load mode and begin counting down. The counts are controlled by the clock signal CK, which passes through an AND gate 64 only when a high signal is present at $Q_3$, signifying the presence of a shaft encoder signal SE. Each shaft encoder pulse allows the counter 62 to count down 24 numbers, as shown by diagram $CT_2$ of FIG. 10. When the counter 62 reaches zero, the entire data for one container reading has been stored in the memory 60. A signal from the counter 62 then clears flip-flop 42, which in turn causes the counter 62 to switch to the low state. The counter 62 then loads to 2400 and waits for another container sensor signal S, which will initiate another code reading process.

Figure 11:
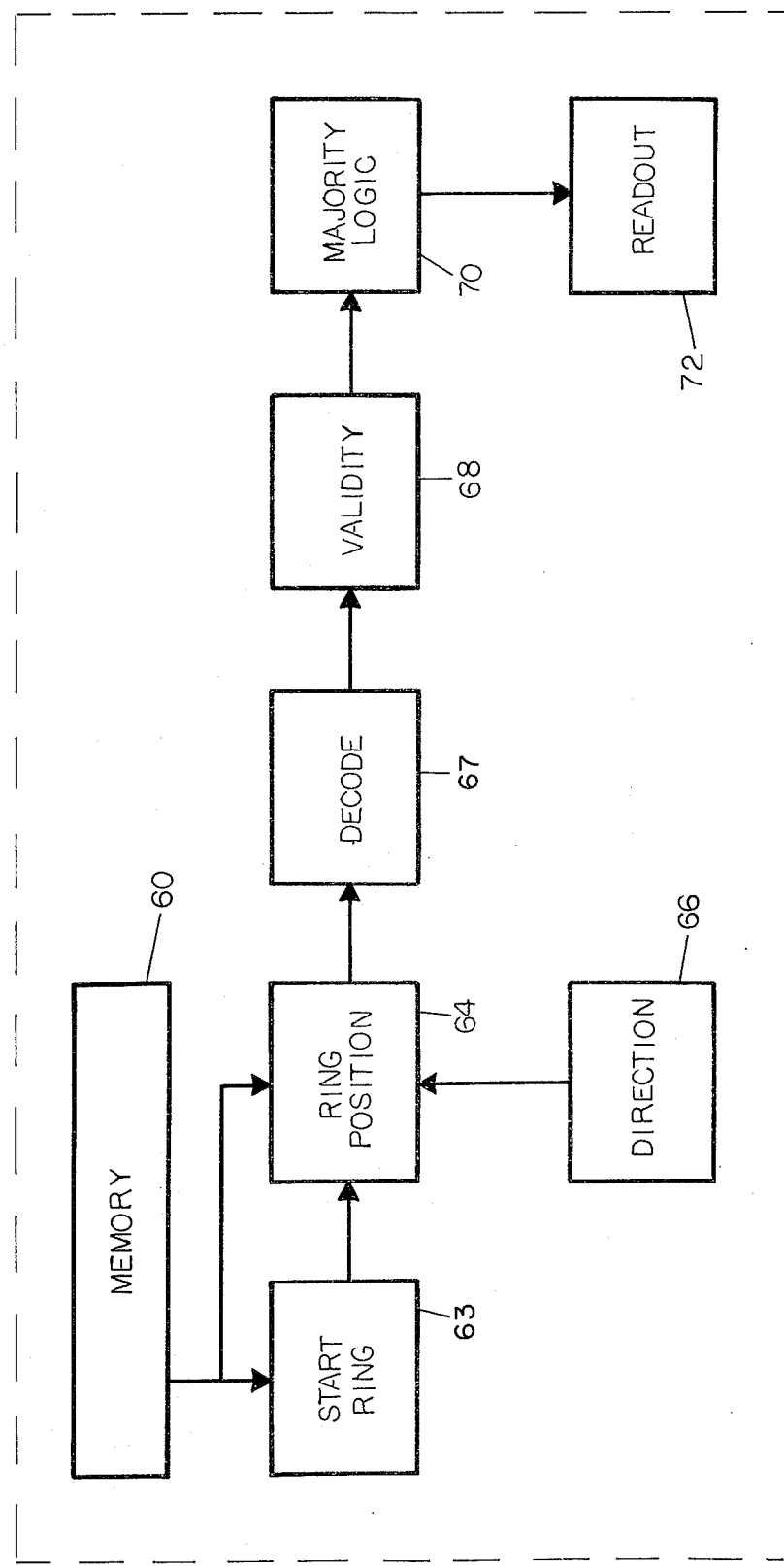
FIG. 11 is a diagram of the steps of the decoding process.

Referring now to FIG. 11, a computer 80 is programmed to analyze the information stored in the memory 60 to determine the mold of origin of a container 10. Initially, readings from the three outside photocells 23h are analyzed in order to determine the position of the start ring 27, as shown by box 63. Sensing of the start ring 27 is accomplished by looking at the amplitude of the readings taken from the outside photocells 23h over a period of time and determining the slope of the amplitude. If the slope exceeds a predetermined level, a start ring 27 is assumed to be present. The position of the start ring 27 marks the point in time where readings from the remainder of the photocells 23 a–h are taken. For example, if a start ring 27 was at a location corresponding to the tenth reading stored in the memory 60, readings from the remainder of the photocells 23 a–h would be analyzed in an area centered about the tenth reading. In this way, readings from the photocells 23 are analyzed only if they correspond to proper positioning of the container 10. This function is carried out separately for each of the three groups of eight photocells 23 a–h.

After the position of the start ring 27 has been determined, the computer decodes the information stored in the memory 60, as shown by boxes 64 and 67. The position of rings 25 is determined in the same manner as the start ring 27, i.e. if the slope of the amplitude in a possible ring position 30 exceeds a predetermined level, a ring 25 is assumed to be present in that location. Once the position of rings 25 has been determined, the binary code represented by the placement of rings 25 may be decoded to decimal form. In the decoding process, the direction of travel of the container 10 past the reading station 14 may be compensated for by instructing the computer the order in which to analyze the readings from each of the photocells 23 a–h, and whether to look for a positive or negative slope, as shown by box 66.

After decoding, a validity check 68 is made of each of the three code readings, as described in connection with FIG. 7. If the validity check is not met, i.e. there were not three total rings 25 and either one or two rings 25 in the three innermost ring positions 30, that particular reading is rejected as invalid. The remaining valid readings are then compared by a majority logic 70, and a code readout 72, identifying the mold of origin of the container 10, is given which corresponds to a majority of the valid readings.

Although there is herein described only one specific embodiment of the present invention, it is to be understood that the invention is not intended to be limited to such embodiment but only by the scope of the appended claims.

What is claimed is:

1. A system for identifying machine molded containers, wherein each container has
    a specularly reflective bottom surface which includes a concentric ring code integrally molded into the bottom surface of said containers, comprising:
    illuminating means for projecting light onto the bottom of said containers at an angle with the intensity of said light being a function of the angle at which the light makes with the general plane of the container bottom;
    light sensing means for detecting light reflected from the container bottoms and the ring code;
    means for moving the containers relative to said illuminating means; and
    code reading means connected to said sensing means for converting reflections from the bottom of the container into a code readout corresponding to the molded ring code of each container as it is moved past said illuminating means.

2. The system of claim 1 wherein said high sensing means includes a photocell light detector whose output is proportional to the intensity of light received.

3. The system of claim 1 wherein said containers are glass bottles.

4. The system of claim 1 wherein said illuminating means includes:
    a light source; and
    a gradient filter between said source and the container bottom, whereby the light emanating from said filter is linearly attenuated along the length of said filter.

5. The system of claim 2 wherein said photocell sensing means includes:
    (a) a plurality of photocell detectors, arranged in a row corresponding to a line extending from the center of the bottom of the container radially to the edge of the container; and
    (b) a lens for focusing light reflected from the bottom of the containers onto said photocell detectors.

6. The system of claim 2 wherein:
    (a) said photocell sensing means includes means for detecting light reflected from a plurality of distinct radial areas of the bottom of the containers; and
    (b) said code reading means includes means for reading said code from each of said radial areas.

7. The system of claim 6 wherein said code reading means further includes:
    (a) means for comparing readings taken from said plurality of radial areas and;
    (b) means for generating a readout which corresponds to a majority of the readings.

8. The system of claim 1 wherein said code reading means includes means for detecting the rate of change in intensity of light reflected from the containers.

9. The system of claim 1 in which the total number of rings molded in a container is the same for each mold and all containers have a specified number of rings molded within a specified group of possible ring positions, wherein said code reading means further includes means for comparing the number of rings actually present, both on the bottom as a whole and within the specific group of positions, with the number of rings read, and means for rejecting readings which do not correspond to possible ring placements.

10. A method for identifying which of a plurality of molds produced a particular glass container comprising the steps of:

integrally molding a code into the bottom of a glass container, said code representing the mold of origin of said glass container and being defined by the presence or absence of concentric molded rings in possible ring positions on the bottom of said glass container;

moving said glass container past a reference point located in a plane generally defined by the bottom of said glass container;

projecting light towards the bottom of said glass container;

modulating the light before it strikes the bottom of said glass container so that the intensity of the light which is specularly reflected from the bottom of said glass container is proportional to the angle of the glass at corresponding areas; and reading said molded code by utilizing light reflected from the bottom of said glass container.

11. The method of claim 10 wherein the step of reading said molded code includes the steps of:
   (a) sensing reflections from the bottom of the glass container from a point corresponding to said reference point as the container moves past the reference point;
   (b) generating signals corresponding to said reflections; and
   (c) electronically converting said signals into a code readout corresponding to said molded code.

12. The method of claim 10 wherein said projected light is modulated by passing it through a gradient filter, which causes the light emanating from said filter to be linearly attenuated in the direction of the filter axis.

13. The method of claim 10 wherein the step of reading said molded code includes taking a plurality of readings from distinct radial areas of said molded code.

14. The method of claim 11 wherein the step of reading said molded code includes taking a plurality of readings from distinct radial areas of said molded code.

15. The method of claim 14 further comprising the steps of:
   (a) comparing said plurality of readings with each other; and
   (b) generating a code readout whose value corresponds to the value of the majority of said readings.

16. The method of claim 11 wherein said reflections are sensed by a photocell detector.

17. The method of claim 11 wherein step (c) includes measuring the rate of change of said generated signal.

18. The method of claim 10 further comprising the steps of:
   (a) restricting said molded code to particular combinations of concentric rings;
   (b) checking said code during the code reading process to see if said restriction has been met; and
   (c) rejecting as invalid any reading that does not meet the restriction of said code.

19. The method of claim 18 wherein said code is limited by:
   (a) molding an equal number of rings into each glass container irrespective of the mold of origin; and
   (b) molding a specified number of rings within a specified group of possible ring positions irrespective of the mold of origin.

20. The method of claim 18 including the steps of taking a plurality of readings from distinct radial areas of said molded code, comparing all of said readings which are valid with each other, and generating a code readout corresponding to a majority of said valid readings.

* * * * *